Dec. 2, 1941.   J. H. STRONG   2,264,919
PARACHUTE DROP AMUSEMENT DEVICE
Filed July 28, 1939   6 Sheets-Sheet 1

INVENTOR
JAMES H. STRONG
his Attorneys

Dec. 2, 1941.  J. H. STRONG  2,264,919
PARACHUTE DROP AMUSEMENT DEVICE
Filed July 28, 1939  6 Sheets-Sheet 3

Dec. 2, 1941.   J. H. STRONG   2,264,919
PARACHUTE DROP AMUSEMENT DEVICE
Filed July 28, 1939   6 Sheets-Sheet 5

Inventor
JAMES H. STRONG,
By Emery, Booth, Holcombe Miller
his Attorneys

Patented Dec. 2, 1941

2,264,919

UNITED STATES PATENT OFFICE 2,264,919

PARACHUTE DROP AMUSEMENT DEVICE

James H. Strong, Windsor, N. J.

Application July 28, 1939, Serial No. 287,153

41 Claims. (Cl. 272—6)

This invention relates to amusement devices of the spectacle type that simulate dangers, and depends for its thrills upon ascent to a high altitude and a swift descent through the air, such as are experienced by a parachute jumper. The invention comprises a tower, hoisting mechanism, guided parachute and swing carried thereby, and aims to provide adequate safeguards against accident to permit participation by the general public with no special training, thus making the device suitable for operation at amusement resorts, fairs and other occasions frequented by large numbers of people.

More particularly, the objects of the invention include improvements in the parachute to permit safe operation in gusty and high winds; an improved construction of swing and its suspending means to prevent accidental falling of passengers or interference by them with any part of the apparatus; the provision of guides and cushioning devices to insure safe and comfortable landing; means for securing the swing to the ground and for assisting passengers to board and leave the swing speedily and without undue exertion; means for lowering the parachute to the ground for rigging and unrigging it readily; and safeguards against breaking of the hoisting cables and failure or improper operation of the motors and other parts of the apparatus.

Further objects and advantages of the invention appear hereinafter in connection with the description of the apparatus designed for and operated at the New York World's Fair, illustrated in the accompanying drawings, wherein

Fig. 7 is a side view, and Fig. 8 is a front view of one of the posts and cushioning apparatus for absorbing the shock on landing, showing the parts in position after completing the descent and pulling down the swing to its normal loading position, with the hoisting head lowered to engage the peak of the parachute ready for an ascent, as shown in Figs. 5 and 6;

Fig. 9 is a cross-section of a post on the line 9—9 in Fig. 7;

Fig. 10 is a view to a larger scale of a shock cord upper end fitting, shown partly in cross-section;

Fig. 12 is a front elevation, and Fig. 13 is a side elevation of the swing, drawn to the same scale as Figs. 7 and 8;

Fig. 15 is a fragmentary cross-section.

Figures 1, 2, 3, 4:
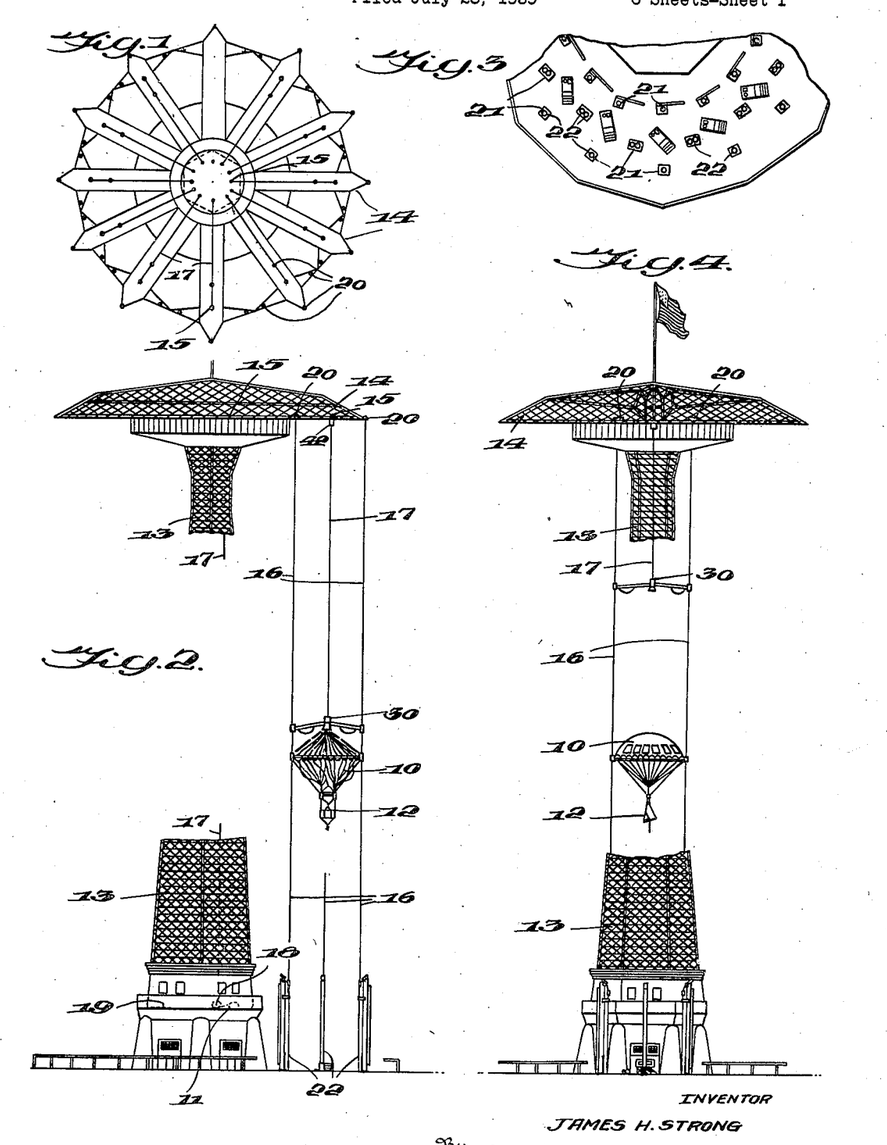
Fig. 1 is a plan view of a suitable tower having twelve arms, eleven of which are equipped to support parachutes.
Fig. 2 is a side elevation of a portion of the tower and cooperating mechanism for one parachute unit, showing the parachute and swing in the process of being raised by the hoisting cable.
Fig. 3 is a plan view of part of the ground apparatus including five operating stations, showing the loading steps in upright position.
Fig. 4 is a side elevation similar to Fig. 2, looking at the apparatus from a direction at right angles to that of Fig. 2, showing the parachute and swing in the act of descending.
Figure 5:
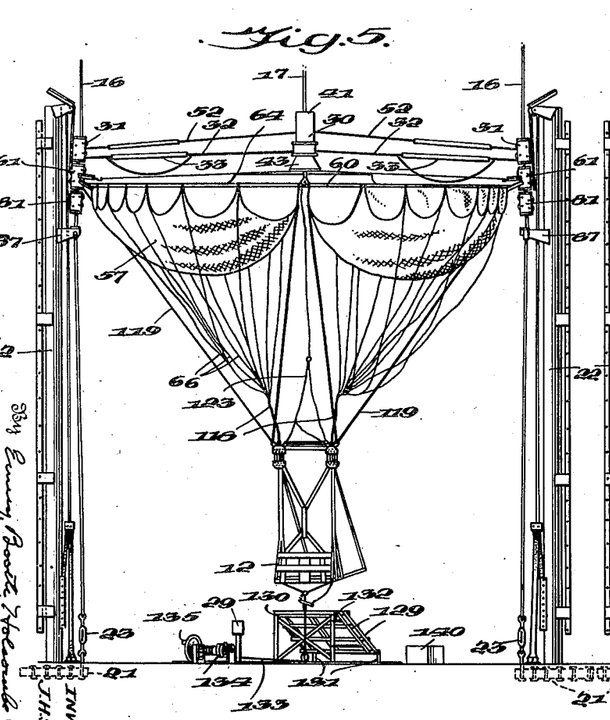
Fig. 5 is a side elevation of the ground apparatus, parachute and hoisting head, showing the steps and swing in position to take passengers, viewing the swing from a rear quarter.
Figure 6:
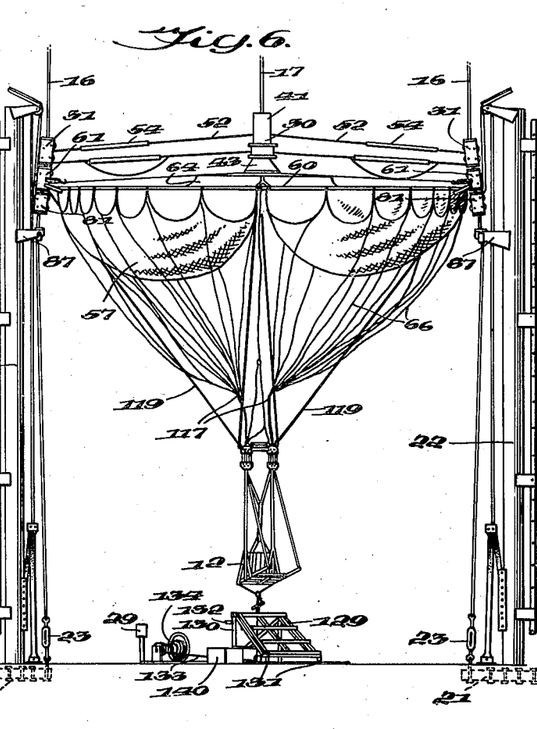
Fig. 6 is a similar elevation at right angles to Fig. 5, viewing the swing from a front quarter, both Figs. 5 and 6 showing the automatic releasing device for disconnecting the swing from the holding down gear in its normal position prior to starting the ascent.

In the apparatus as built for the New York World's Fair, there are eleven parachutes 10, complete with their individual hoisting motors 11, swings 12, loading stations and operating mechanism, and the skeleton steel tower 13 is 250 feet high to the arms 14 which support the upper pulleys 15 of the hoisting apparatus and the upper ends of the guide cables 16. The hoisting cables 17 run over the pulleys 15 and down inside the tower to the winding drums 18 of the electric hoists, which are mounted on an operating floor or platform 19 above the base of the tower, as illustrated in Fig. 1. There are four guide cables 16 for each parachute 10, the upper ends of which pass over drums 20 which are secured to the arms 14 and may be operated to raise and lower the guide cables in case of need. The lower ends of the guide cables 16 are secured to foundation blocks 21 upon which the cushioning posts 22 are mounted, there being a turn buckle 23 or other adjusting means for adjusting the tension of each guide cable to keep it sufficiently taut to avoid undue sidewise movement of the parachutes in their ascent and descent. There are four posts 22 at each station, preferably made of steel tubes or other material having some lateral flexibility, and tall enough to afford adequate space for cushioning the parachute at the end of its drop.

The hoisting drums 18 are of standard design and are provided with automatic guides for laying the cables 17 on them as they are wound up and unwound and the usual safety devices. They are driven through suitable reduction gears by electric motors equipped with push-button controlled starting rheostats. Automatic brakes also operated by push-button control means are provided for the hoisting drums. The system comprises a control panel at each motor and another control panel 29, at each ground station, with the necessary electric circuits and power lines, all of this electrical equipment being of standard design, and these parts of the system require no detailed description.

Each hoisting cable is provided at its free end with a head 30 for attaching it to the corresponding parachute and which is guided centrally between the guide cables by means of sliding fittings 31 to which it is connected by steel wires or cables 32 fitted with short sections of rubber cord 33 to give them a limited amount of stretch. The hoisting heads are entirely automatic in their operation; each preferably embodies a grappling and relasing mechanism for engaging a fitting on the peak of the parachute similar to that illustrated in my Patent No. 2,121,413, dated June 21, 1938, for an automatic releasing device, together with a safety device connected to brakes on the sliding fittings 31 for arresting its descent should the hoisting cable break or give way.

In the apparatus illustrated, each hoisting head comprises a pair of sliding jaws 34 mounted on rollers 35 and which are normally held together by springs 36 to engage under the shoulder of the conical head 37 on the peak of the parachute. Each jaw is connected to the lower end of a cam lever 38, the middle of which rides freely against a fixed roller 39 and the upper end of which engages under a vertically slidable plate 40 also carried by the hoisting head, so that when the latter reaches the top of its travel, the sliding plate will be depressed by the engagement of the spring buffer plate 41, to which it is connected, against the under side of a fixed stop 42 mounted on the arm of the tower, thereby compressing the springs 44 and opening the sliding jaws 34 and permitting the parachute to drop.

The hoisting head safety device comprises a coil spring 45 connected at its upper end to the cable 17 near its point of attachment to the hoisting head and at its lower end to the lines 46 that run around a pulley 47 on the outer end of an arm 48 projecting from the side of the hoisting head and around the pulleys 49 near the axis of the hoisting head to a plate 50 centrally disposed therein and supported on the inner ends of four radially disposed pivoted latches 51, to the outer ends of which are loosely hooked the inner ends of four lines 52 leading to the brakes 53 (see Fig. 7) on the sliding fittings 31. These lines are provided with short rubber cord sections 54, and each normally maintains a constant pull on the brake block to which it is connected, holding it out of engagement with the guide cable 16 upon which the sliding fitting is mounted against the pressure of the brake block applying spring 55; but should the hoisting cable break or give way, the line 46 would slacken and permit the plate 50 to disengage the ends of the latches, thereby releasing the lines 52 and permitting the brake blocks 53 to be forced against the corresponding guide cables to hold the sliding fittings 31 and prevent the hoisting head from falling.

Each parachute comprises a canopy 57 which is removably secured to a steel spreader ring 60 around its perimeter by means of straps 58 or other suitable fastenings, and this ring is attached by snap hooks 59 at four points to guide blocks 61 slidably mounted on the guide cables 16. The canopy is provided at its peak with a ring 62 carrying a spider 63 having a central lifting post 37 projecting up sufficiently for the jaws of the hoisting head to engage under its shouldered upper end, and is tapered to enter the guide cone 43 with which the hoisting head is provided.

The peak of the canopy is strengthened by fabric reinforcement 64 surrounding and attached to the ring 62, and by radially extending strips 65 of webbing or other strong material following the lines of and covering the shrouds 66 of the exterior of the canopy. In lieu of shroud lines running along the two principal diameters of the canopy at the ends of which the guide fittings 61 are attached, webbing strips 67, 68, connect the peak ring with the spreader ring, the strips 67 being secured on the inside of the canopy from peak to skirt and bifurcated at the lower ends where they engage the ring. The four outside stays 68 which lead to the guide 61 are left unattached to the skirt for a distance inwards near their outer ends, and flat rubber cords 69 are connected across the intervening space, their ends being securely fastened to the stays. Arms 70 provided with snap hooks project inwards from the guide blocks 61 above the connections for the ring 60 and are adapted to receive and hold the rings upon the ends of the stays 68 when the parachute is rigged. The rubber cords 69 are enough shorter than the adjacent portions of the stays 68 to take up the slack in the stays when the canopy is not fully inflated by its descent through the air, and serve to maintain the peak portion substantially flat and concentric with the principal axis of the hoisting cable about which the four guide cables are symmetrically disposed. The lower arms 71 on the guide blocks support the stiffening or spreader ring in concentric relation to the other parts of the apparatus when the parachute is not inflated.

The parachute canopy is provided with one or more series of circumferentially disposed narrow openings 72 constituting automatic valves positioned in the middle area and near the perimeter of the skirt, and which are normally closed in the fully open position of the canopy by fabric covers 73 or pockets attached to its under side. These pockets are of greater length than the openings which they cover and are attached thereto along their sides and lower edges and are unattached along their upper edges, the inner ends of the pockets being open to provide a channel from each opening to the under side of the canopy. The shape, number and arrangement of these valved openings is such as to relieve external air pressure on the canopy during its upward movement and while it is being held stationary in vertically extended position, thereby largely preventing bellying inwards and violent flapping of the canopy during the time when it is not freely dropping.

A supporting harness or catcher 74 made of strips of suitable material stitched together in the form of cross stays and diagonal stays is secured to the guide fittings 61 in the space beneath the canopy to prevent the canopy from sagging when not inflated. Short strips of webbing 75, connected to the cross stays and the ends of which are provided with rings which engage in snap hooks on the inner sides of the guide fittings, hold the harness taut at all times.

The cushioning posts 22 in the apparatus illustrated are hollow steel columns about twenty feet high, supported at their lower ends in concrete pedestals 21 and spaced alongside the lower ends of the guide cables 16 and radially outside of them with respect to the vertical axis of each parachute station. At the upper end of each post is a pulley 77 over which the shock absorbing line 78 runs from the connector 79 for the flexible rubber shock cords 80 to the lower sliding fitting 81 on each guide cable. The lower ends of the shock cords are pinned to a stationary fitting 82 set in the base. As many shock cords as is found necessary may be pinned to the base fitting 82 and connector 79, and by changing the number of cords, the resistance to the landing shock of the parachute and loaded swing may be varied to suit operating conditions. The pins 83 in the connector and base fittings are readily removable for this purpose, being secured in place by nuts, cotter pins or other suitable means.

Figures 7, 8, 9, 10:
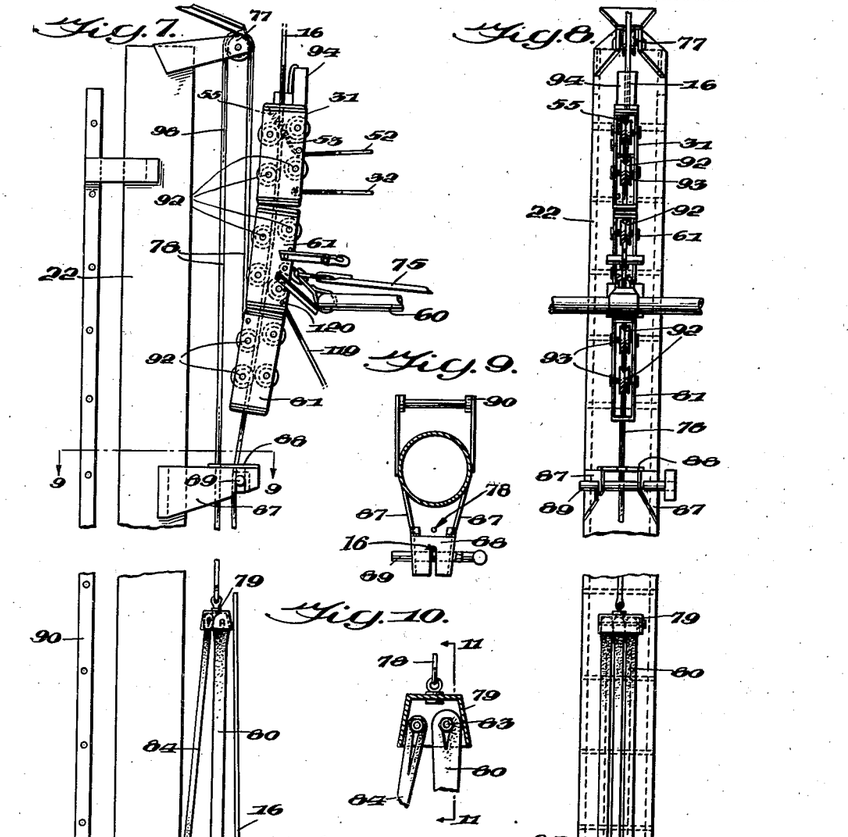
Figure 11:
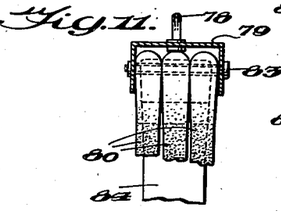
Fig. 11 is a cross-section of the same on the line 11—11 in Fig. 10.

One or more additional shock cords 84 are pinned to the connector 79 at one end and the other end is secured to the adjacent post 22 at a point some two or three feet above the base by an adjustable pin 85 which may be inserted in any pair of a series of holes spaced vertically in two parallel plates 86 secured to the post along their edges, as shown in Figs. 7 and 8. These auxiliary shock cords 84 are shorter and stiffer than the principal shock cords 80, and the arrangement is such that they may be adjusted to come into play after the cords 80 with sufficient force to prevent the sliding fittings 81 from bumping on the brackets 87, one of which is provided about six feet below the top of each post, and which limit the descent of the parachute to prevent the swing and passengers from striking the ground. The cushioning posts are preferably unsupported at the upper end to permit them to yield sidewise somewhat under the shock of the falling parachute, thereby aiding in cushioning the fall and saving other parts of the apparatus from undue strain.

The brackets 87 are provided with hinged plates 88 pivoted to the arms which support them from the posts, so as to be swung up out of the way when it is desired to lower the parachute to the ground, and each plate is provided with a slot to permit the adjacent guide cable to pass through it, each guide cable being held in its slot during normal operation of the apparatus by a stop latch 89 which projects across and closes the open end of the slot, as shown in Fig. 9. A ladder 90 may be secured to the outer side of each cushioning post to give convenient access to the adjacent parts of the apparatus.

The guide fittings are provided with sets of small grooved pulleys or guide wheels 92, mounted on ball bearings 93, and disposed in pairs at the upper and lower ends of the guide fittings to engage the corresponding guide cables and reduce the friction between the fittings and cables. Each hoisting head guide fitting 31 may be provided with an oiling device 94 comprising a reservoir and a wick feed duct leading to a wiper or pair of wipers between which the guide cable passes. Periodically these reservoirs may be filled with oil, thus insuring a constant supply to the wipers, and reducing the wear on the cables and guide wheels.

Figures 12, 13:
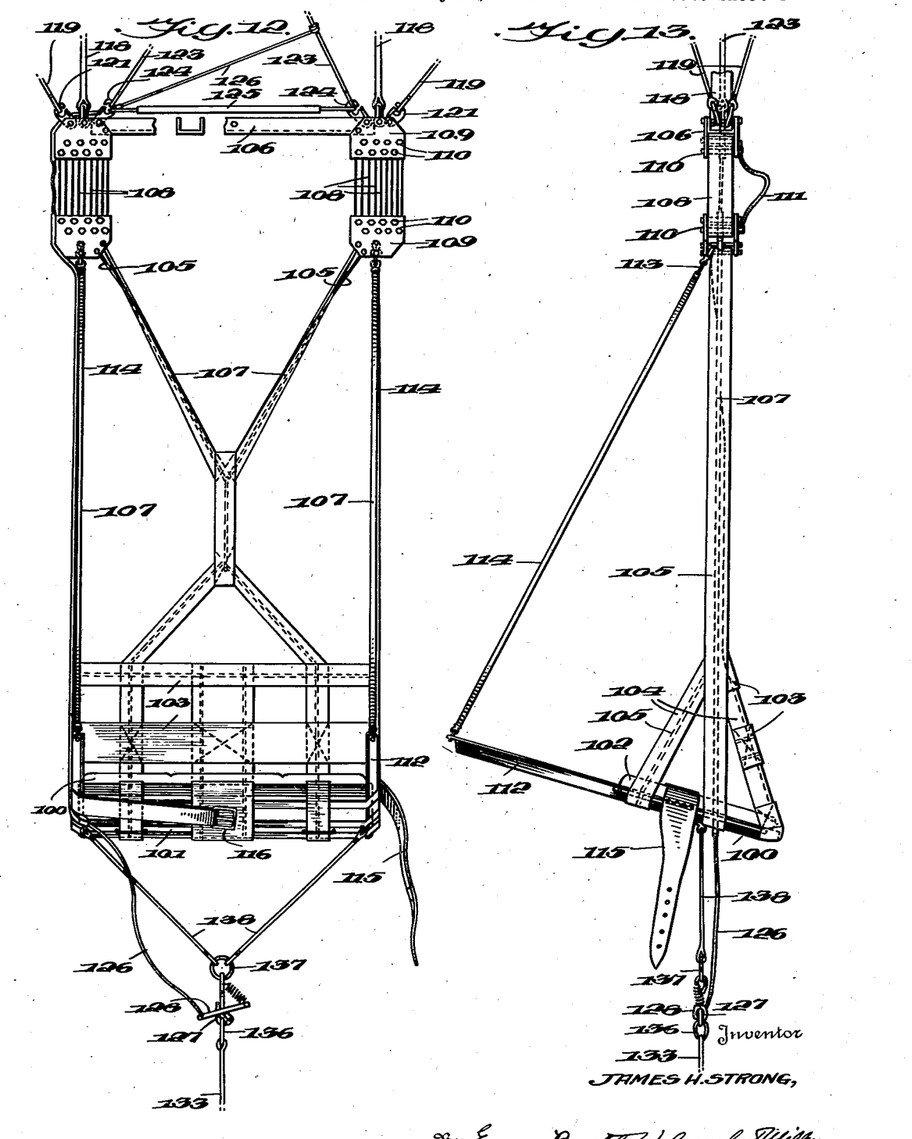
Figure 14:
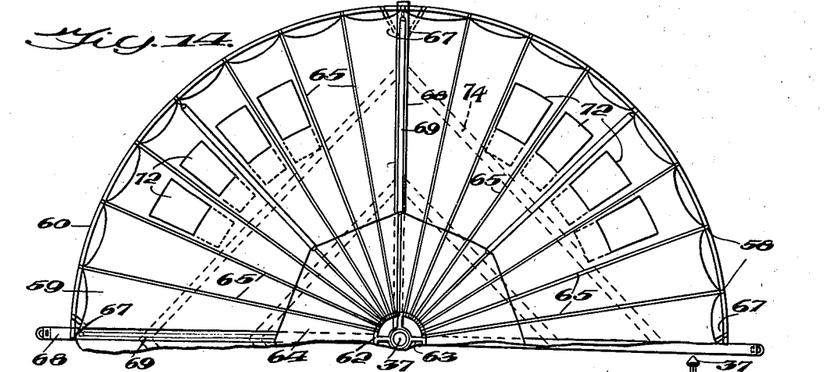
Fig. 14 is a half top view.
Figure 15:
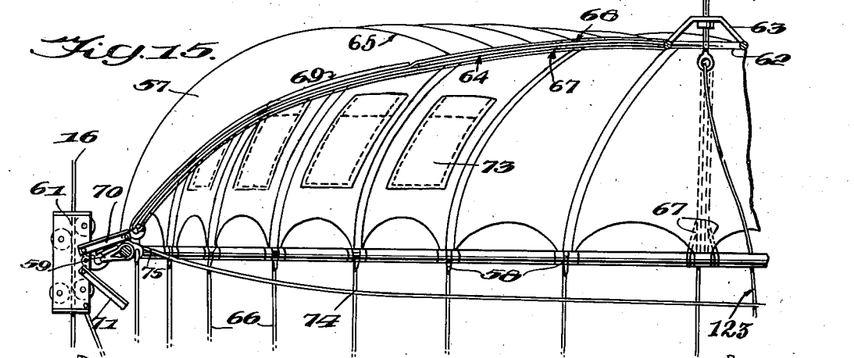
Figure 16:
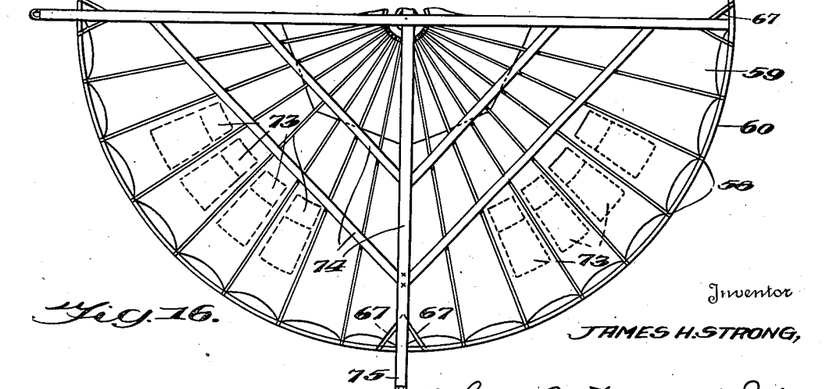
Fig. 16 is a half bottom view of a parachute, Figs. 14 and 16 being drawn to a smaller scale than Fig. 15.
Figures 17, 18:
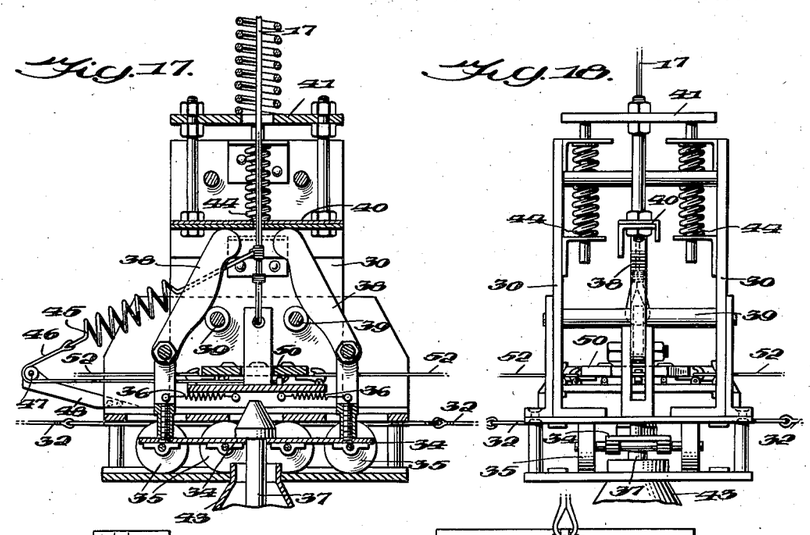
Fig. 17 is a vertical axial cross-section of a hoisting head showing the cable and safety connection to the guide fitting in running position.
Fig. 18 is a side view of the same.
Figure 19:
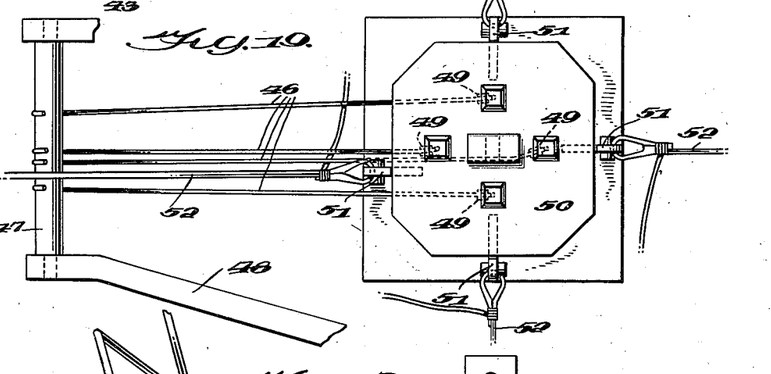
Fig. 19 is a plan view and Fig. 20 is a side view of a portion thereof, Figs. 19 and 20 being drawn to a larger scale than Figs. 17 and 18.
Figure 20:
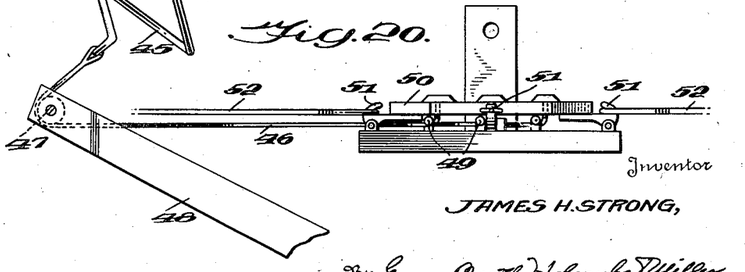

The swing 12 is made of a light metal frame 100, a wood bottom 101 supported thereby and in turn supporting a cushion 102, and a flexible back 103 and sides 104 made of webbing reinforced with fine wire cables 105, all supported from a spreader bar 106, by spring suspension means from which depend two webbing members 107 reinforced with metal cables and secured at their lower ends to members running to the sides and corners of the seat, and to the back, as illustrated in Figs. 12 and 13. These webbing members pass completely under the seat to constitute a sling for supporting the seat and passengers. The spring suspension means includes two groups of rubber shock members 108, one at each end of the spreader bar, secured between upper and lower fittings 109 which are provided with removable pins 110 to enable the number of rubbers to be changed to suit different conditions of use. Two safety cables 111 limit the amount of stretch of the rubber shock members.

In order to prevent overturning of the swing, a bar 112 projects forward from the seat frame on each side, and each bar is connected at its front end with the lower rubber fitting 109 by means of a cable 113 enclosed in a stiff metal tube 114. A wide webbing strap 115, made double and reinforced with light wire cables, is secured at one end beneath the seat and the other end may be passed over the laps of the passengers and made fast below the seat by means of a strong buckle 116, out of reach of the passengers. Thus the passengers may be secured to the seat so as to prevent them from falling, and the parts of the swing are so constructed that the passengers cannot overturn the swing or free themselves by the use of knives or other means available to them while in the air.

The spreader or suspension bar 106 is suspended from the parachute directly by the shrouds 66, which are brought down in two groups and made fast to shackles 117 connected to the spreader bar by heavy webbing supports 118 embracing U-shape fittings at its ends. The spreader bar is also suspended from the guide cables 16 and spreader ring 60 by means of four cables 119 each of which is secured to a pin 120 in the lower end of one of the guide blocks 61 by means of a ring, and the lower ends of these cables 119 are connected to snap hooks 121 at the ends of the spreader bar, thereby providing a reliable suspension means for the swing. As each canopy skirt spreader ring 60 is strapped to the guide blocks so as to be held in place between the arms 70 and 71 which project inwardly far enough to engage above and below the spreader ring, the failure of one or two fittings or cables will not permit the swing to break away from the parachute, which is attached to the spreader ring by straps at the end of each gore seam and to the guide fitting by the stays 68, even should the ring itself break.

For elevating the swing when the parachute is deflated, a separate bridle 123 is provided, the upper end of which is attached to the center post 37 in the peak of the parachute, and the lower ends of which are attached to snap hooks 124 at the ends of the spreader bar. This bridle is made just long enough to carry the weight of the swing when the parachute is extended vertically by the hoisting means without putting any strain on the suspension cables or shrouds, so that when the parachute is inflated the bridle will be slack. A rubber cord 125 holds the snap hooks in place properly when the bridle is slack. A light line 126 is connected to one part of the bridle near the lower end to trip the holding down hook 127 by raising the keeper 128 when the hoisting cable picks up the weight of the swing and stretches the bridle taut, as hereinafter described.

The shock cords 80 normally support the sliding fittings 81 and deflated parachute, swing and hoisting head near the tops of the cushioning posts, in which position the swing is four or five feet above the ground, and steps 129 are provided for convenient access. These steps are preferably supported on a metal frame 130, which is pivoted at its front end to a base frame 131 and provided with a handle 132 for turning it over to remove the steps from under the swing after the passengers are seated in order to make room for the swing to drop nearly to the ground upon its descent. A hold down cable 133 is provided for holding the swing down at a convenient height above the ground to enable the passengers to get on and off the swing, the releasable hook 127 being connected to its free end as shown in Figs. 12 and 13. At the rear end of the ground frame is mounted a hand winch 134 having a winding drum geared to a crank 135 and provided with a ratchet and pawl device for preventing unwinding of the cable. The free end of the cable is detachably secured to the swing by ring 136 which hooks into the pelican hook 127 which in turn is supported by a ring 137 secured beneath the seat by short tie members 138. The keeper 128 is tripped by the line 126 which runs to the bridle when the lifting strain of the hoisting cable straightens out the bridle to lift the swing, thereby automatically releasing the swing from the holding down cable and permitting the swing to ascend, the shock cords 80 assisting in starting the swing upwards when the holding down cable is released.

The apparatus may be operated by a single ground attendant, although two attendants can handle the passengers more expeditiously. After the passengers are seated, the safety strap 115 is buckled around them, and the hoisting motor starting button on the control panel 29 is pressed to elevate the swing. The pelican hook 127 trips automatically, and after the swing clears the cushioning posts, the steps 129 are turned over forwards out of the way by the attendant, who then watches the ascent until the hoisting head reaches the top of its travel and the contact member 41 strikes the fixed tripping plate 42 on the arm overhead and opens the sliding jaws 34 to release the parachute. At the same time the hoisting motor 11 is automatically stopped. The attendant thereupon presses the button on the control panel 29 to reverse the hoisting motor and lower the hoisting head. Should anything go wrong during the ascent or descent, the motor 11 can be stopped by turning off the current by the main power switch at either the motor control panel or the ground control panel.

When the parachute starts to drop, the valve openings 72 are immediately closed by the pockets 73 and it inflates fully in about twenty feet of free drop and thereafter controls the speed of descent to between twenty-five and thirty feet per second, depending upon the load and air conditions. These valve openings 72 permit the parachute to be hoisted without bellying and slatting against the guide cables even in a variable wind of considerable strength.

At the bottom of the descent the sliding fittings 61 on the parachute ring strike the sliding fittings 81 on the upper ends of the cushioning posts and depress them, thereby stretching first the principal shock cords 80 and immediately thereafter the auxiliary shock cords 84. These cords are so adjusted that the momentum of the parachute, swing and passengers will be counterbalanced and checked just before the sliding fittings 81 strike the brackets 87. The tension in the stretched shock cords will thereupon lift the parachute, swing and passengers four or five feet, and as the swing comes to rest the attendant hooks on the holding down cable 133 and operates the winch 134 to pull the swing down to a convenient level for the passengers to disembark, and then tips the step back into place and unbuckles the safety strap.

The provision of a holding down means for regulating the height at which the swing is held to load and unload passengers makes very high steps unnecessary, and expedites the handling of the passengers, as the attendants can stand on the ground and reach them without difficulty, assisting them so that they do not fall in getting on and off the swing, and making sure that they are properly strapped in place and that they have a firm grip on the sides of the swing and on each other. A box 140 is preferably provided for men's and ladies' hats and slippers and other articles that might otherwise be lost off or dropped while in the air.

The swing is so designed that the passengers cannot overturn it either accidentally or purposely, and the webbing back, sides and safety belt prevent them from falling or jumping off the seat, as they cannot slide out from under the belt. Even small children and drunken persons can be carried with safety, and the rate of ascent and descent is slow enough to prevent physical discomfort or strain upon persons with sensitive or weak organs.

The invention is not restricted to the particular design shown in the drawings, as it is contemplated that changes in the arrangement and details of construction will be necessary to suit manufacturing conditions and locations, and variations in the manner and kind of use of the several novel features. Where the word "swing" is used in the claims, I mean to include any equivalent device for carrying a suspended load; and by the word "resilient" I mean to include elastic substances generally, which when deformed, tend to return to their original shape or dimensions.

I claim the following as my invention:

1. Parachute apparatus comprising an overhead support, a base support projecting above the ground, guide means extending from the overhead support to said base support, means sliding on said guide means for directing the free descent of a parachute canopy, shock absorbing means associated with and supported by said base support at a point above the ground for arresting the descent of said canopy, said shock absorbing means including a member movably supported in the path of descent of said directing means to be engaged by the latter, and resilient means connected to said movably supported means for opposing its movement.

2. Parachute apparatus comprising an overhead support, a base support projecting above the ground, guide means extending from the overhead support to said base support, means sliding on said guide means for directing the free descent of a parachute canopy, shock absorbing means associated with and supported by said base support at a point above the ground for arresting the descent of said canopy, said shock absorbing means including a member slidably arranged on said guide means to be engaged by the latter in the path of descent of said directing means, and resilient means connected to said slidable member for opposing its movement.

3. Parachute apparatus comprising an overhead support, guide means extending from the overhead support to a base support, means sliding on said guide means for directing the free descent of a parachute canopy, shock absorbing means associated with said base support for arresting the descent of said canopy, said shock absorbing means including a member movably supported in the path of descent of said directing means, resilient means connected to said movably supported means for opposing its movement, and a swing for carrying a passenger supported independently by said parachute and by said guide means.

4. Parachute apparatus comprising means for guiding a parachute canopy in its descent, said guiding means including guide cables, guides slidable thereon, a spreader ring secured to the skirt of said canopy, and means for loosely securing said ring to said guides, said canopy having flexible members distributed around and depending below its skirt and connected to a spreader bar, connections between the ends of said spreader bar and said guides, a swing for carrying a passenger suspended from said spreader bar, and resilient means associated with said guide cables for checking the downward movement of said guides at the lower end of the path of descent of said parachute.

5. Parachute apparatus comprising means for guiding a parachute canopy in its descent, said guiding means including guide cables, guides slidable thereon, a spreader ring secured to the skirt of said canopy, and means for loosely securing said ring to said guides, said canopy having shrouds depending below its skirt and connected to a spreader bar, connections between the ends of said spreader bar and said guides, a swing for carrying a passenger suspended from said spreader bar, and adjustable means associated with said guide cables including rubber cushioning members for checking the downward movement of said guides at the lower end of the path of descent of said parachute.

6. Parachute apparatus comprising means for guiding a parachute canopy in its descent, said guiding means including guide cables, guides slidable thereon, means for securing said canopy directly to said guides, said canopy having shrouds depending below its skirt connected to a spreader bar, connections between the ends of said spreader bar and said guides, a swing for carrying a passenger suspended from said spreader bar, and means associated with said guide cables for checking downward movement of said guides and swing at the lower end of the path of descent of said parachute.

7. Parachute apparatus as described in claim 6 wherein the canopy and shrouds are detachably connected to the other parts of said apparatus for convenience in unrigging and stowing the canopy when not in use.

8. Parachute apparatus comprising means for guiding a parachute canopy in its descent, said guiding means including guide cables, guides slidable thereon, connections between said canopy and guides consisting of a spreader ring secured to the skirt of said canopy, and means for loosely securing said ring to said guides, a spreader bar suspended from said canopy, connections between the ends of said spreader bar and said guides, a swing for carrying a passenger suspended from said spreader bar, and means for checking the downward movement of said guides and swing at the lower end of the path of descent of said parachute.

9. Parachute apparatus comprising means for guiding a parachute canopy in its descent, said guiding means including guide cables, guides slidable thereon, a spreader ring secured to the skirt of said canopy, and means for securing said ring to said guides, a spreader bar suspended from said canopy, connections between the ends of said spreader bar and said guides, a swing for carrying a passenger suspended from said spreader bar, and means for checking the downward movement of said guides and swing at the lower end of the path of descent of said parachute, said checking means including a plurality of stretchable shock cords.

10. Parachute apparatus as described in claim 9 comprising adjustable anti-recoil members for modifying the action of said shock cords.

11. Parachute apparatus comprising means for guiding a parachute canopy in its descent, said guiding means including guide cables, guides slidable thereon, a spreader ring secured to the skirt of said canopy, and means for loosely securing said ring to said guides, a spreader bar suspended from said canopy, connections between the ends of said spreader bar and said guides, a swing for carrying a passenger suspended from said spreader bar, and means for checking the downward movement of said guides at the lower end of the path of descent of said parachute, said checking means including a plurality of adjustable shock cords whereby the speed of descent of said parachute and swing may be checked more or less abruptly.

12. In a parachute apparatus as described in claim 11, a second series of shock cords adapted to come into action consecutively with said adjustable shock cords to provide for conjoint action of both sets of shock cords in checking the descent of the swing without excessive recoil.

13. Parachute apparatus comprising an overhead support, guide means extending from the overhead support to one or more base supports, flexible posts mounted on the latter adjacent to the lower ends of said guide means, means operating on said guide means for directing the descent of a parachute canopy, shock absorbing means carried by said posts for arresting the descent of said canopy above the base, and resilient means carried by said canopy for supporting a passenger.

14. Parachute apparatus comprising an overhead support, guide means extending from the overhead support to one or more base supports, posts mounted on the latter adjacent to the lower ends of said guide means, means operating on said guide means for directing the descent of a parachute canopy, shock absorbing means carried by said posts for arresting the descent of said canopy at a safe height above the base, means carried by said canopy for supporting a passenger, and means for adjusting the height of said parachute and passenger supporting means at the lower end of its path of movement for enabling a passenger to mount and dismount from said passenger carrying means.

15. Parachute apparatus comprising an overhead support, guide means extending from the overhead support to one or more base supports, posts mounted on the latter adjacent to the lower ends of said guide means, means operating on said guide means for directing the descent of a parachute canopy, shock absorbing means carried by said posts for arresting the descent of said canopy above the base, freely swinging means carried by said canopy for supporting a passenger, and means for holding said freely swinging means stationary at a convenient elevation for enabling access thereto by passengers.

16. Parachute apparatus comprising an overhead support, guide means extending from the overhead support to one or more base supports, posts mounted on the latter adjacent to the lower ends of said guide means, means operating on said guide means for directing the descent of a parachute canopy, shock absorbing means carried by said posts for arresting the descent of said canopy above the base, freely swinging means carried by said canopy for supporting a passenger, and means for holding said freely swinging means stationary at a convenient elevation for enabling access thereto by passengers, said holding means including a manually operated device for pulling down the parachute against the resistance of said shock absorbing means.

17. Parachute apparatus comprising a tower provided with radially disposed overhanging arms, each supporting a hoisting cable extending from a winding drum housed within the tower, a parachute canopy detachably connected to each hoisting cable, sets of parallel guide cables extending from the arms to the base of the tower and secured at both ends to provide a fixed guide means for each parachute canopy, said guide means also operating to prevent overturning said tower, posts adjacent the lower ends of said guide cables, and shock arresting means associated with said posts each comprising a member slidable on the adjacent guide cable, whereby the shock of arresting the descent of said canopies is taken up independently of said tower.

18. Apparatus of the kind described in claim 17 having parachute canopies approximately thirty feet in diameter, a tower over one hundred feet high, shock absorbing posts at least fifteen feet high, and rubber shock cords providing sufficient extension for checking the canopies in not over six feet of travel, whereby each canopy will sustain two persons without excessive speed of descent or objectionable shock upon landing.

19. Parachute apparatus comprising a base and overhanging tower providing a means for supporting a hoisting mechanism including a cable and hoisting head, a parachute canopy adapted to be connected to the hoisting head, guide means for the canopy and hoisting head extending between the tower and base, and means associated with said guide means and head for arresting the movement of said head upon the failure of said cable.

20. Parachute apparatus comprising a base and overhanging tower providing a means for supporting a hoisting mechanism including a cable and hoisting head, a parachute canopy adapted to be connected to the hoisting head, a plurality of guide means for the canopy and hoisting head extending between the tower and base, and brake means slidable upon said guide means connected to and operated from said head for arresting the movement of said head upon the failure of said cable.

21. Parachute apparatus comprising a base and overhanging tower providing a means for supporting a hoisting mechanism including a cable and hoisting head, a parachute canopy adapted to be connected to the hoisting head, guide means for the canopy and hoisting head extending between the tower and base, and means associated with said guide means and head for arresting the movement of said head upon the failure of said cable, said associated means comprising a friction device normally held out of operative engagement with said guide means by a tie member connected to said cable above its point of connection to said head.

22. A parachute device comprising a fabric canopy, means at the peak of the canopy for securing a lifting cable, means associated with the skirt of the canopy for guiding it in its ascent and descent, and means associated with the peak of the canopy for centering it with respect to said guide means when not inflated, said means being extensible to permit full inflation of said canopy.

23. A parachute device comprising a fabric canopy, means at the peak of the canopy for securing a lifting cable, means associated with the skirt of the canopy for maintaining it extended and guiding it in its ascent and descent, and means associated with said guide means for supporting said canopy therefrom when not inflated.

24. A parachute device comprising a fabric canopy, means at the peak of the canopy for securing a lifting cable, means associated with the skirt of the canopy for guiding it in its ascent and descent, means associated with the canopy for connecting its peak to said guide means when not inflated to maintain its central alinement, said means being extensible to permit full inflation of the canopy, and means associated with said guide means for supporting said canopy therefrom when not inflated.

25. A parachute device comprising a fabric canopy, means at the peak of the canopy for securing a lifting device, means associated with the skirt of the canopy for guiding it in its ascent and descent, means associated with the canopy for connecting its peak to said guide means when not inflated to maintain its central alinement, said means being extensible to permit full inflation of the canopy, and means for quickly detaching said guiding means from the skirt of the canopy and from the peak alining means to permit the canopy to be readily removed.

26. A parachute device comprising a fabric canopy, means at the peak of the canopy for securing a lifting device, means associated with the skirt of the canopy for guiding it in its ascent and descent, and means associated with said guide means for supporting said canopy therefrom when not inflated, said canopy having a series of spaced openings covered by valves opening inwardly to relieve external air pressure on said canopy produced by the wind.

27. Parachute apparatus comprising a canopy provided with shrouds for supporting a swing for carrying a passenger, means for hoisting said canopy by its peak, means directly connecting the peak of said canopy and said swing for lifting the latter independently of said shrouds, means for holding down said swing to permit passengers to embark and disembark, and means for automatically releasing said holding down means upon raising the peak of said canopy to lift said swing.

28. Parachute apparatus comprising a canopy provided with shrouds or flexible members for supporting a swing for carrying a passenger, means for hoisting said canopy by its peak, means directly connecting the peak of said canopy and said swing for lifting the latter independently of said shrouds, means for holding down said swing to permit passengers to embark and disembark, and means for automatically releasing said holding down means upon raising the peak of said canopy to lift said swing, said releasing means including a releasable hook and a flexible connection attached at one end to said swing lifting means and at the other end to said hook.

29. Parachute apparatus comprising a canopy provided with shrouds or flexible members for supporting a swing for carrying a passenger, means for hoisting said canopy by its peak, means directly connecting the peak of said canopy and said swing for lifting the latter independently of said shrouds, means for holding down said swing to permit passengers to embark and disembark, and means for releasing said holding down means upon raising the peak of said canopy to lift said swing, said holding down means including a cable having one end connected to a winding device and the other end adapted to be connected to said swing.

30. In a parachute amusement apparatus comprising a tower, parachute hoisting means supported by the tower, parachute guide means supported by the tower, a parachute having means engaging said guide means for maintaining its skirt extended, and a swing supported from said parachute, and there being space for access to said swing at the lower end of said guide means, the combination of means for positioning the swing in said space at the lower end of its travel, and adjustable means for cushioning the downward movement of the swing at the lower end of the travel of the parachute.

31. Parachute apparatus as described in claim 30 wherein the means for cushioning the swing at the bottom of the descent also serves to assist the hoisting means to start raising the swing and load carried thereby.

32. In a parachute amusement apparatus including a loading station for passengers and a tower, the combination of means supported on the tower for elevating a parachute including a releasing device for permitting the parachute to drop freely when fully raised, a plurality of cables supported from the tower for guiding the parachute in its descent, guides connected to the parachute and slidable on said cables, posts standing alongside and clear of the lower ends of the guide cables for supporting the parachute clear of the loading station, and means adjacent to the lower ends of said cables cooperating with said guides and posts for bringing the parachute to rest without shock.

33. Parachute apparatus of the character described in claim 33 wherein the posts are spaced outside of the guide cables and provided with means for holding the guide cables outwards against the pull of the guides sliding thereon as the parachute approaches the bottom of its descent.

34. Parachute apparatus of the character described in claim 33 wherein the posts are spaced outside of the guide cables and provided with means for holding the guide cables outwards against the pull of the guides sliding thereon as the parachute approaches the bottom of its descent, said guide cable holding means being movable to free the guide cables to permit the guides and parachute to be dropped to approach the loading station level for dismantling or adjustment.

35. Parachute apparatus of the character described in claim 35 wherein the parachute supporting means at the loading station is adjustable to permit the parachute to be lowered to the loading station level.

36. A parachute device comprising an overhead support and a lifting cable, a canopy, means at the peak of the canopy for attaching the lifting cable, spaced guides suspended from said support, means engaging said guides for holding the skirt of the canopy extended, means for connecting said peak to said skirt holding means, shrouds extending from peak to skirt of said canopy and having their lower ends depending from said skirt and gathered into groups, a spreader to which said groups of shrouds are adapted to be attached, a non-extensible connection between said peak and spreader and resilient suspension means on said spreader for supporting a passenger.

37. Parachute apparatus of the kind described in claim 36 comprising swing suspension means for elevating the passenger, provided with means for holding down the swing against the pull of the swing suspension means and automatic means for releasing said holding down means to reduce the shock on said lifting cable when picking up the passenger.

38. A parachute device comprising an overhead support and a lifting cable, a canopy, means at the peak of the canopy for attaching the lifting cable, spaced means associated with said support for holding the skirt of the canopy extended, means slidable on said spaced means for connecting said spaced means to said skirt, shrouds extending from peak to skirt of said canopy and having their lower ends depending from said skirt and gathered into groups, a spreader to which said groups of shrouds are adapted to be attached, a flexible connection between said peak and spreader, and suspension means on said spreader for supporting a passenger.

39. Parachute apparatus of the kind described in claim 38, wherein the spreader is provided with a plurality of connections at oppositely spaced points for attaching it to said slidable means.

40. Parachute apparatus comprising means for guiding a parachute canopy in its descent, said guiding means including guide cables, guides slidable thereon, connections between the skirt of said canopy and said guides, a spreader suspended from said canopy, connections between said spreader and said guides, a swing for carrying a passenger suspended from said spreader, and means adapted to engage said guides for checking the downward movement of said canopy and swing at the lower end of the path of descent of said parachute.

41. Parachute apparatus as described in claim 40 wherein the means for checking the downward movement of the guides and swing is withdrawable from the path of descent of said parachute to permit the latter to be lowered adjacent to the ground.

JAMES H. STRONG.

CERTIFICATE OF CORRECTION.

Patent No. 2,264,919. December 2, 1941.

JAMES H. STRONG.

It is hereby certified that error appears in the printed specification of the above numbered patent requiring correction as follows: Page 7, first column, lines 59 and 66, claims 33 and 34 respectively, for the claim reference numeral "33" read --32--; and second column, line 6, claim 35, for the claim reference numeral "35" read --32--; and that the said Letters Patent should be read with this correction therein that the same may conform to the record of the case in the Patent Office.

Signed and sealed this 6th day of January, A. D. 1942.

(Seal)

Henry Van Arsdale,
Acting Commissioner of Patents.